(12) United States Patent
Huynh et al.

(10) Patent No.: US 6,230,918 B1
(45) Date of Patent: May 15, 2001

(54) QUICK-ON FILLER NECK CAP

(75) Inventors: Tho Truong Huynh, Southampton; Bruce T. Mowatt, South Wales, both of (GB)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/234,721

(22) Filed: Jan. 21, 1999

(51) Int. Cl.[7] .......................... B65D 41/06; B65D 51/16; B65D 53/02
(52) U.S. Cl. .................. 220/300; 220/86.2; 220/203.06; 220/203.12; 220/304
(58) Field of Search .................................. 220/300, 86.1, 220/86.2, 304, 297, 562, 202, 203.04, 203.05, 203.06, 203.12, 203.27, 203.29, 203.28

(56) References Cited

U.S. PATENT DOCUMENTS

| | | | |
|---|---|---|---|
| 5,071,020 | * 12/1991 | Reutter | 220/300 |
| 5,361,924 | 11/1994 | Muller . | |
| 5,385,256 | 1/1995 | Brown . | |
| 5,395,004 | 3/1995 | Griffin et al. . | |
| 5,480,055 | 1/1996 | Harris et al. . | |
| 5,540,347 | 7/1996 | Griffin . | |
| 5,617,969 | * 4/1997 | Reichmann | 220/300 |
| 5,791,507 | 8/1998 | Harris et al. . | |
| 5,794,806 | 8/1998 | Harris et al. . | |
| 5,829,620 | 11/1998 | Harris et al. . | |

* cited by examiner

Primary Examiner—Gregory M. Vidovich
Assistant Examiner—Niki M. Eloshway
(74) Attorney, Agent, or Firm—Barnes & Thornburg (57) ABSTRACT

The invention is a cap engagable with a filler neck of a vehicle fuel tank, the cap having a core including an axially lower end, an axially upper end, and an exterior side wall extending between the axially lower and upper ends. A handle is coupled adjacent the axially upper end of the core and adapted to rotate the core about an axis of rotation between a loosened position permitting removal of the core from the filler neck and a tightened position securing the core within the filler neck. The cap further includes a seal positioned to lie around the core and a sleeve movable axially by the handle. The sleeve and has an interior side wall defining a chamber formed in the sleeve. The core lies within the chamber, and the seal lies between the sleeve and the core. A gap is formed between the seal and the interior side wall of the sleeve during rotation of the core relative to the filler neck from the loosened position to the tightened position, and the gap is eliminated when the cap is in the tightened position.

16 Claims, 7 Drawing Sheets

FIG. 9

QUICK-ON FILLER NECK CAP

BACKGROUND AND SUMMARY OF THE INVENTION

The present invention relates to a cap for closing the mouth of a filler neck, and in particular, to fuel caps for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Fuel caps are used to close the filler neck of a vehicle fuel tank. Typical fuel caps include a closure member for closing the mouth of the filler neck and a handle for turning the closure member to mount the closure member in the filler neck. By closing the mouth of the filler neck, liquid fuel is prevented from splashing out of the vehicle fuel tank.

According to the present invention, a fuel cap is provided including a core, a handle cover coupled to the core, a sleeve positioned around the core, and a seal coupled to the core between the core and the sleeve. The handle cover, core, and seal can rotate relative the sleeve so that when the fuel cap is positioned to lie within a corresponding vehicle filler neck and the handle cover is rotated, the core and seal rotate, but the sleeve does not rotate.

The sleeve includes an interior side wall that includes a sealing surface and a recessed surface that is axially lower and radially outward of the sealing surface. As the core rotates, the sleeve moves further into the filler neck from an axially upper position to an axially lower position. While the sleeve is in the axially upper position, the seal is positioned to lie adjacent to the recessed surface of the sleeve so that a gap exists between the sleeve and the seal. As the sleeve moves to the axially lower position, the seal moves in the gap and relative to the sleeve to a position engaging the sealing surface of the sleeve to create a sealed barrier to block flow of liquid and gas between the core and the sleeve.

In preferred embodiments, the recessed surface of the sleeve and the seal cooperate to provide means for maintaining a gap between the seal and the sleeve during rotation of the core and seal relative to the sleeve until the sleeve reaches the axially lower position at which time the seal engages the sealing surface of the sleeve to form the sealed barrier blocking flow of liquid and gas between the sleeve and the core.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 11 is a view similar to FIG. 10 showing a position of the cam after it has been moved along an inclined ramp of the cam follower and while the sleeve is in the intermediate position shown in FIG. 7a.

DETAILED DESCRIPTION OF THE DRAWINGS

Figure 1:
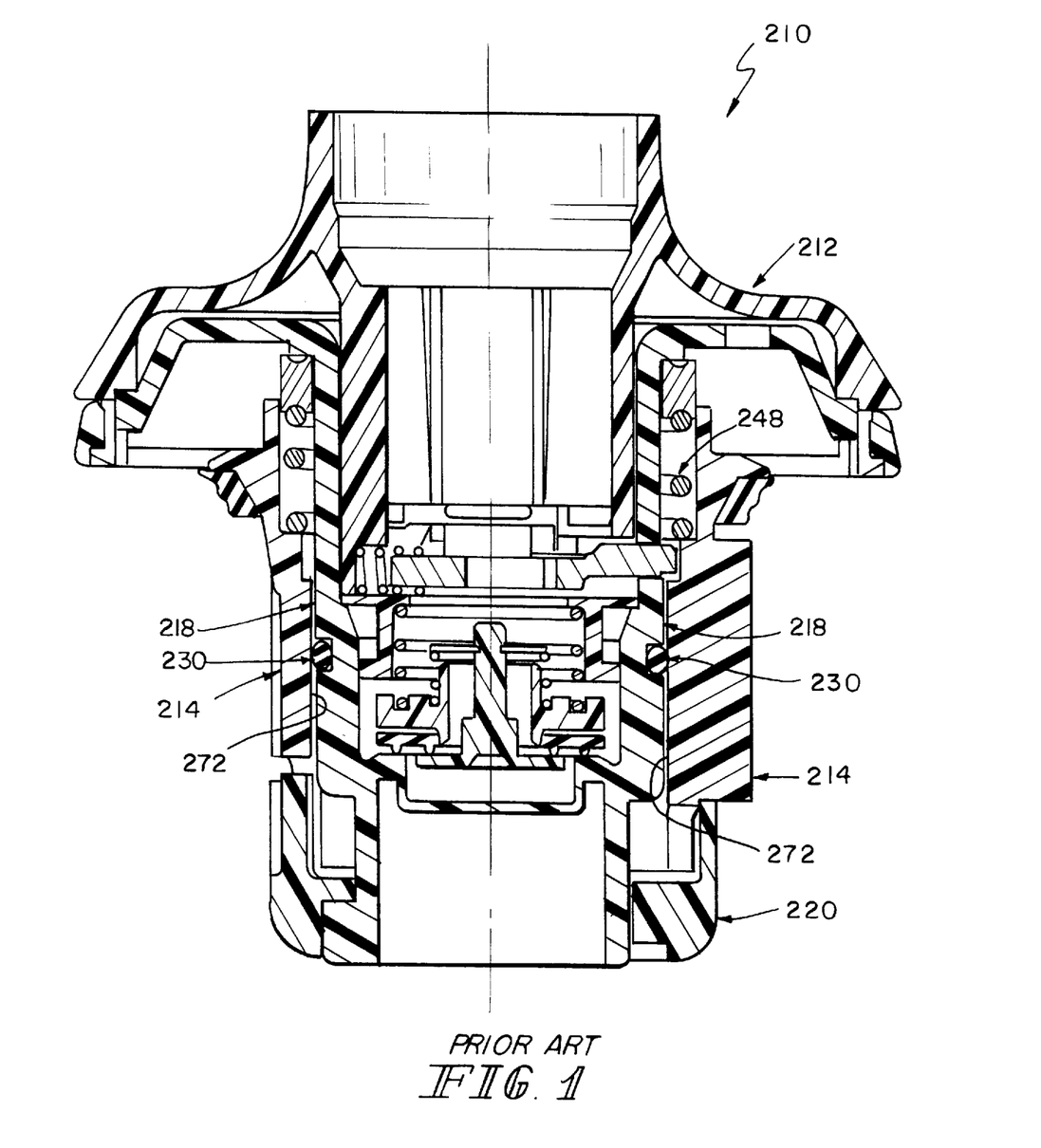
FIG. 1 is a cross-sectional view of a prior art fuel cap.

A quick-on fuel cap 210 part number 4100057-8, revision 3 made by Britax Wingard Limited located at Castle Trading Estate, East Street, Portchester, Hampshire, PO16 9SD, England is shown in FIG. 1. Cap 210 includes a handle cover 212, a core body 218 coupled to handle cover 212, an O-ring 230 coupled to core body 218, a sleeve 214 positioned to extend around core body 218, a lug member 220 coupled to a lower end of core body 218, and a spring 248 positioned to lie between an upper end of core body 218 and sleeve 214 to bias sleeve 214 downwardly against lug member 220. Sleeve 214 includes an interior side wall 272 arranged to engage O-ring 230 to form a sealed barrier between sleeve 214 and core body 218.

Figure 2:
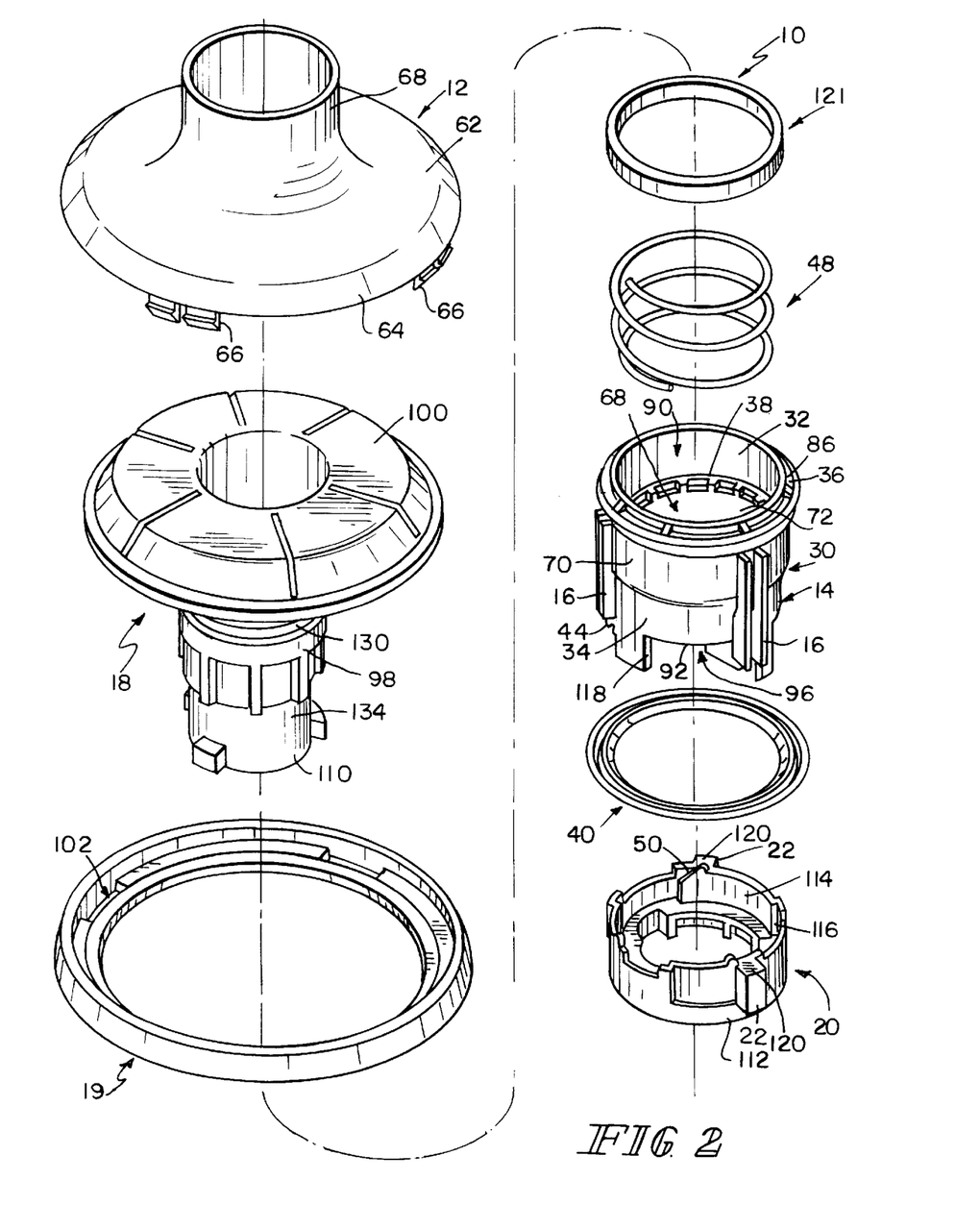
FIG. 2 is an exploded perspective view of a quick-on cap according to the present invention showing a handle cover including snap finger appended to a bottom side of the handle cover, a mushroom-shaped core body including three spaced-apart coupling lugs appended to a lower end of the core body, a core-retaining ring positioned beneath the core body and formed to include snap finger-receiving apertures, a spring-retaining ring at the top of the right column of quick-on cap components, a coil spring, a sleeve including an inner spring-receiving flange and three exterior ribs (one not shown), a ring-shaped seal, and a lug member including three external lugs.
Figures 3, 10:
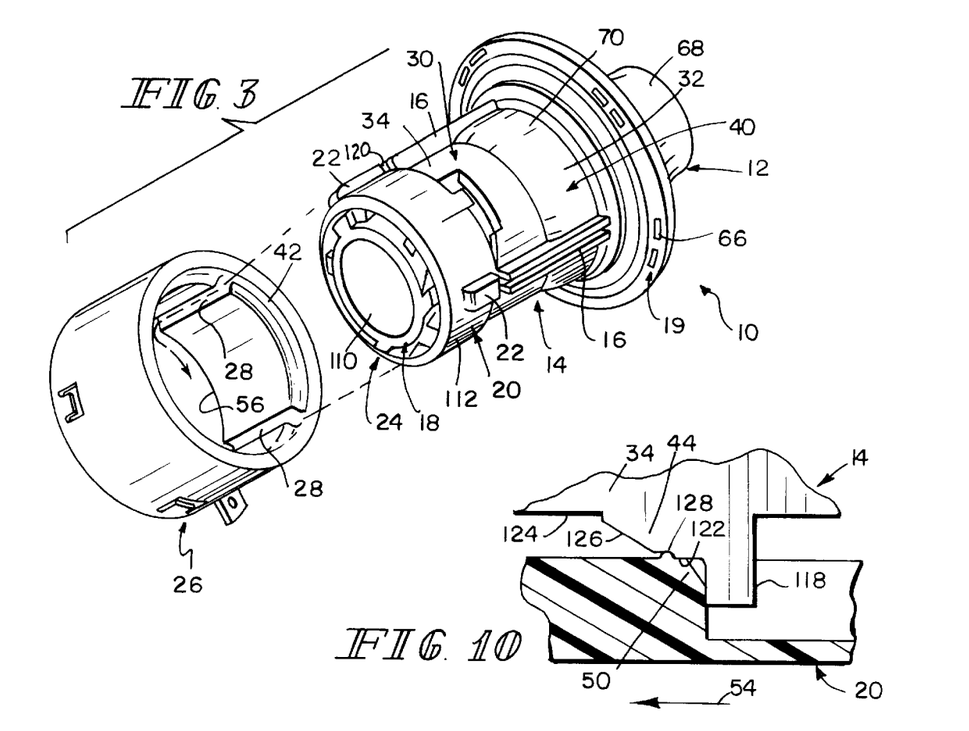
FIG. 3. is a perspective view of an assembled quick-on cap of FIG. 2 as it is about to be inserted into a filler neck provided with three axial grooves (one not shown) and an axially lower rim.
FIG. 10 shows a flat development of a downwardly extending cam follower appended to a lower end of the sleeve and an upwardly extending cam appended to the lug member resting on a lower platform of the cam follower while the sleeve is in the upper position shown in FIG. 5.

A quick-on cap 10 in accordance with the present invention is shown in FIG. 3 as it would appear to a user about to insert cap 10 into a filler neck 26. As shown in FIG. 2, cap 10 includes a handle cover 12, a sleeve 14 having three radially outwardly projecting, axially extending, and circumferentially spaced-apart ribs 16, a core body 18, a core retainer 19, and a lug member 20 having three radially outwardly projecting and circumferentially spaced-apart retaining lugs 22. Core body 18 and lug member 20 are coupled together to form a core 24 that along with sleeve 14 cooperate to define a closure body underneath handle cover 12.

Initially, as shown in FIG. 3, ribs 16 are aligned axially with retaining lugs 22 to permit a user to insert cap 10 into filler neck 26 as shown in FIG. 3. Filler neck 26 is formed to include three circumferentially spaced-apart, axially extending slots 28 (one not shown) for receiving three aligned pairs of ribs 16 and retaining lugs 22 during insertion of cap 10 into filler neck 26.

Axially extending slots 28 in filler neck 26 receive three aligned pairs of ribs 16 and retaining lugs 22 during insertion of cap 10 into filler neck 26 to constitute a gripping portion of filler neck 26 disposed axially inwardly from the mouth internally in filler neck 26. This gripping portion internally in filler neck 26 may take any number of suitable forms including radially inwardly extending abutments or flanges. Ribs 16 of sleeve 14 prevent rotation of sleeve 14 in filler neck 26. Similarly, spaced-apart retaining lugs 22 on lug member 20 prevent axial outward movement of cap 10 from filler neck 26 after full installation of cap 10 in filler neck 26. Other methods and structures corresponding to retaining lugs 22 may take any number of suitable forms to cooperate with such abutments or flanges in a filler neck.

Essentially, therefore, quick-on cap 10 aligns sleeve 14 with filler neck 26 to permit axial insertion and axial movement of sleeve 14 in filler neck 26 but not rotation of sleeve 14 within filler neck 26, as well as couples core 24 with filler neck 26 once core 24 is rotated in a cap-installation direction 54 relative to sleeve 14 to prevent axial outward movement of cap 10 from filler neck 26.

Figure 5:
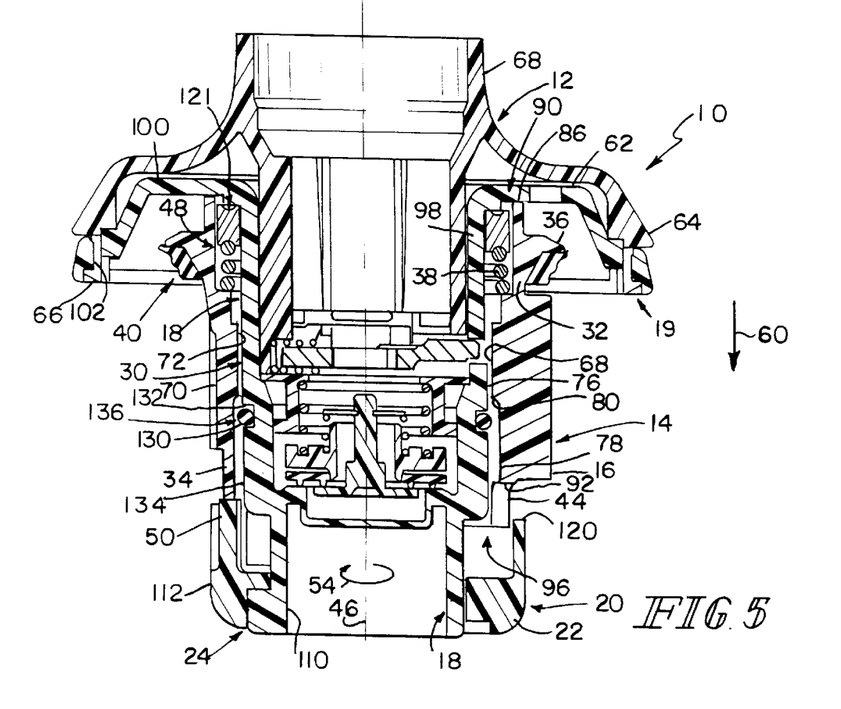
FIG. 5 is a cross-sectional view of the fuel cap taken along line 5—5 of FIG. 4 showing the sleeve positioned in an axially upper position relative the core body and including an interior side wall including a recessed surface cooperating with an O-ring seal coupled to the core body to define a gap between the sleeve and the O-ring.
Figure 9:
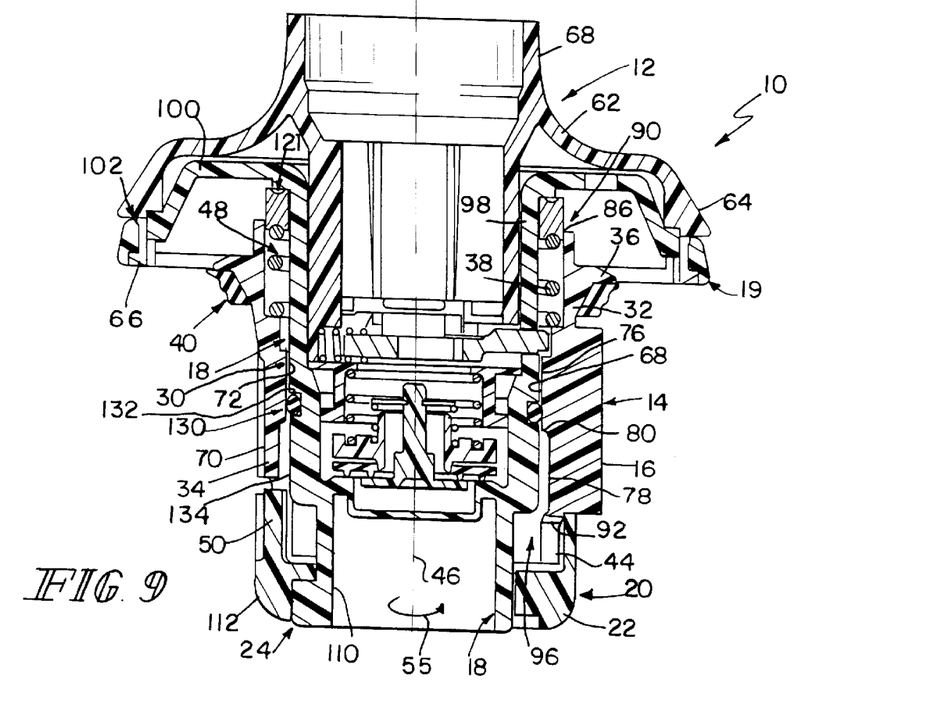
FIG. 9 is a cross-section view of the fuel cap taken along line 9—9 of FIG. 8 showing the fuel cap in the tightened position after the handle cover, the core, and the O-ring have been fully rotated by the user so that the sleeve has been moved to an axially lower position and the O-ring has been moved relative to the sleeve from a position adjacent to the recessed surface of the sleeve to a position engaging a sealing surface of the interior side wall so as to form a sealed barrier between the seal and the core body.

As shown in FIGS. 2 and 5, sleeve 14 includes a cylindrical body 30 including an axially upper end 32, an axially lower end 34, a radially outwardly extending annular top flange 36 at upper end 32, and a radially inwardly extending annular top flange 38 at upper end 32. An O-ring 130 is coupled to core body 18 to establish a gap 136 between sleeve 14 and O-ring 130 as shown in FIG. 5. Sleeve 14 moves axially downward in direction 60 so that O-ring 130 is compressed between sleeve 14 and core body 18, as shown in FIG. 9, to establish a fuel vapor seal between core body 18 and sleeve 14. An annular sealing ring 40 is carried by annular top flange 36, as shown in FIG. 5, so that it can be pressed against an annular rim 42 at the outer edge of filler neck 26 to establish a fuel vapor seal therebetween during the axially downward motion of sleeve 14. At least one cam follower 44 is appended to lower end 34 of sleeve 14 to engage a portion of lug member 20.

As shown in FIG. 5, core body 18 is coupled to handle cover 12 and lug member 20 is coupled to core body 18 so that core 24 will rotate about an axis of rotation 46 in response to manual rotation of handle cover 12 about axis 46 during installation and removal of filler neck cap 10. A compression spring 48 is provided inside cap 10 to urge sleeve 14 and core 24 in opposite directions so that each cam follower 44 on lower end 34 of sleeve 14 is yieldably biased against an underlying cam 50 formed on lug member 20 as shown, for example, in FIGS. 10–12.

Figure 4:
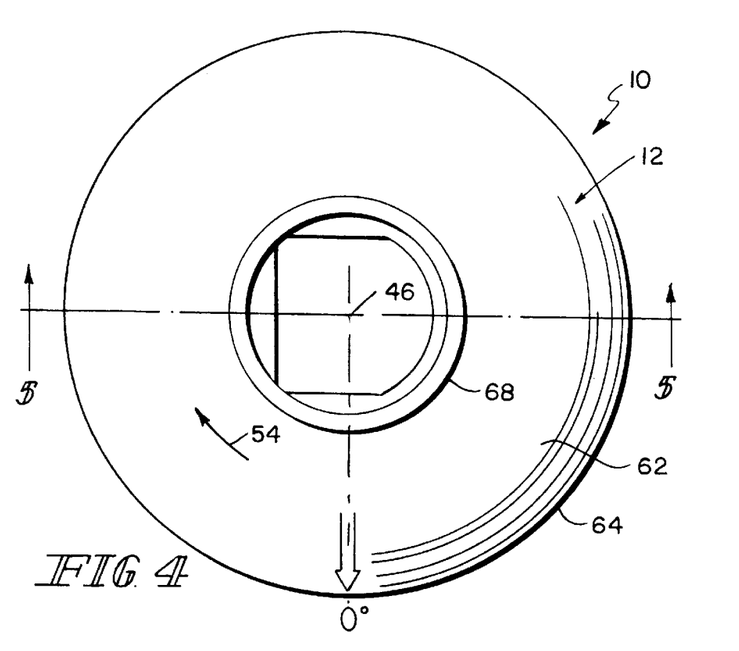
FIG. 4. is a top plan view of the fuel cap of FIG. 3 showing the handle cover before it is turned by a user from a "loosened" position (shown in FIG. 5) to a "tightened" position (shown in FIG. 9) relative to the filler neck and sleeve.
Figure 6:
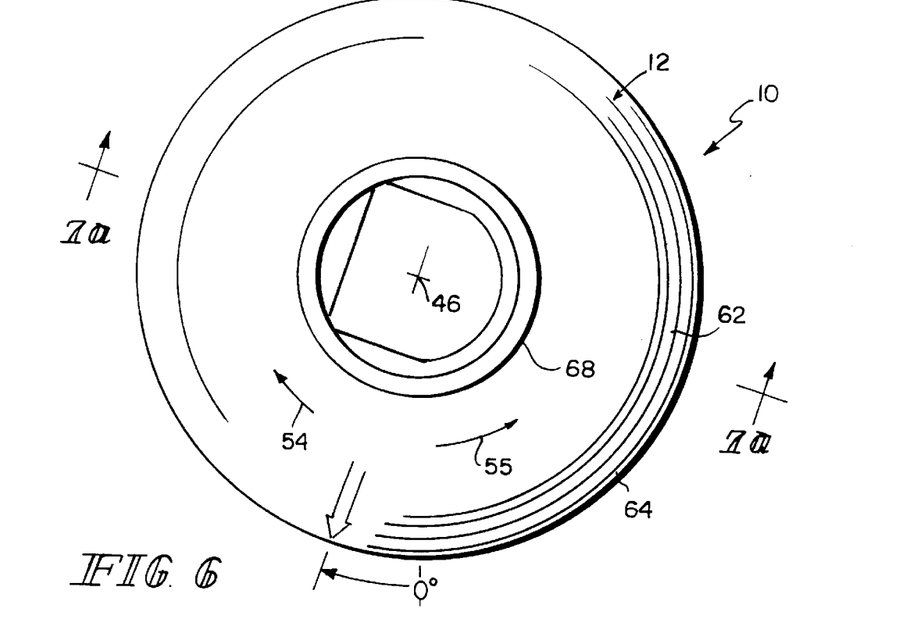
FIG. 6 is a top plan view similar to FIG. 4 showing the handle cover rotated about a central axis of rotation in a clockwise direction to an intermediate position during rotation of the handle cover and the core relative to the filler neck between the loosened and tightened positions.
Figure 8:
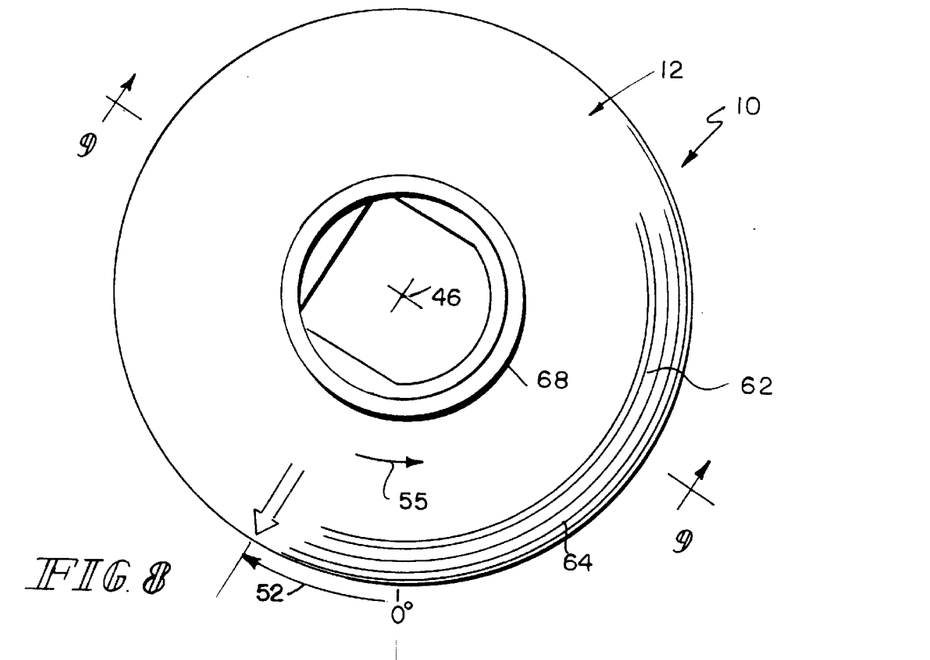
FIG. 8 is a top plan view similar to FIGS. 4 and 6 showing the handle cover rotated about the axis of rotation in a clockwise direction to the tightened position relative the filler neck and the sleeve.

As shown in FIGS. 4, 6, and 8, handle cover 12 is rotated about axis of rotation 46 in cap-advancing direction 54 to rotate core 24 in a clockwise installation direction in filler neck 26. To remove cap 10, handle cover 12 is rotated about axis of rotation 46 in a cap-removal direction 55 to rotate core 24 in counterclockwise removal direction 55 in filler neck 26 and removed from filler neck 26.

In use, quick-on cap 10 is installed easily on filler neck 26 to establish a fuel vapor seal between cap 10 and filler neck 26. A user takes cap 10, inserts it axially into filler neck 26 as shown in FIG. 3 to position annular sealing ring 40 carried on top flange 36 of sleeve 14 opposite to annular rim 42 on filler neck 26, and then rotates handle cover 12 one-twelfth of a revolution (30°) about axis 46 through an angle 52 in a clockwise or cap-installation direction 54. Such rotation of handle cover 12 rotates core 24 relative to sleeve 14 to move retaining lugs 22 into engagement with an internal rim 56 formed in filler neck 26. Ribs 16 on sleeve 14 act as anti-rotation ribs because they engage internal grooves 58 (shown in FIG. 3) in filler neck 26 to block rotation of sleeve 14 relative to filler neck 26 during rotation of handle cover 12 and core 24 relative to filler neck 26.

Figure 7A:
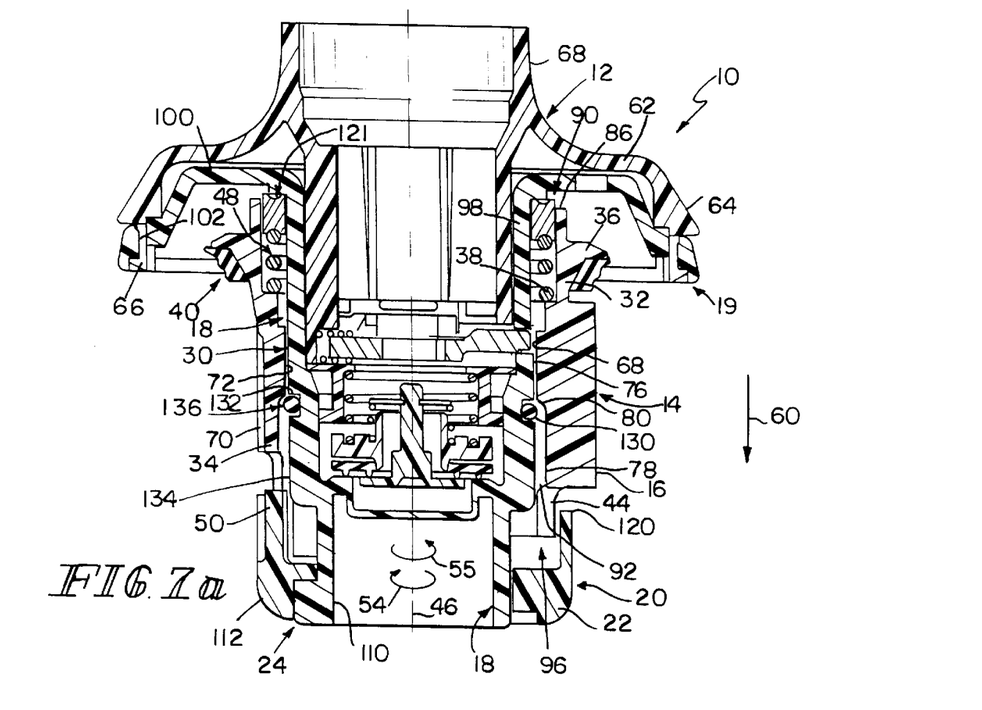
FIG. 7a is a cross-sectional view of the fuel cap taken along line 7a—7a of FIG. 6 showing the fuel cap in the intermediate position as the core and the O-ring are rotated relative the sleeve and the filler neck so that the sleeve is in an intermediate axial position relative the core body below the axially upper position shown in FIG. 5.

At the same time, rotation of core 24 about axis 46 rotates cam 50 relative to spring-loaded cam follower 44 so that spring 48 is "released" to move sleeve 14 from an axially upper position, as shown in FIG. 5, further into filler neck 26 in axially inward direction 60 through an intermediate position shown in FIG. 7a to an axially lower position shown, for example, in FIG. 9. This inward movement of sleeve 14 causes a sealing surface 76 of sleeve 14 to move in inward direction 60 to engage and compress O-ring 130 to establish a fuel vapor seal between sleeve 14 and core body 18. This movement also causes annular top flange 36 on sleeve 14 to move in inward direction 60 toward annular rim 42 on filler neck 26 to compress annular sealing ring 40 tightly between cap 10 and filler neck 26 and establish a fuel vapor seal between sleeve 14 and filler neck 26.

In effect, sleeve 14 and core 24 cooperate to grip filler neck 26 so that O-ring 130 is compressed between sleeve 14 and core body 18 and sealing ring 40 is compressed between sleeve 14 and filler neck 26 in response to movement of core 24 relative to sleeve 14 in cap-installation direction 54. Because annular gap 136 exists between sleeve 14 and O-ring 130 during rotation of core body 18 relative to sleeve 14, sleeve 14 does not "scuff" O-ring 130 until O-ring 130 engages sleeve 14 as shown in FIG. 9.

Cap 10 is removed easily from filler neck 26 for refueling by rotating handle cover 12 about axis of rotation 46 in cap-removal direction 55. Cap 10 is twisted one-twelfth of a revolution (30°) through angle 52 in cap-removal direction 55 from the position shown in FIGS. 8 and 9 through the intermediate position shown in FIGS. 6 and 7a to the loosened position shown in FIGS. 4 and 5. As cap 10 is turned, sleeve 14 and O-ring 130 again cooperate to define gap 136 so that sleeve 14 does not scuff O-ring 130 during further rotation of cap 10. Now, as shown in FIG. 3, retaining lugs 22 are withdrawn from their cap-anchoring positions engaging internal rim 56 formed in filler neck 26.

Cap 10 is now in a position where it can be withdrawn easily from the mouth of filler neck 26.

An exploded perspective view of quick-on cap 10 is provided in FIG. 2 to illustrate a preferred embodiment of the various components in cap 10. Sleeve 14 is preferably formed as illustrated in FIGS. 2 and 5 to include axially extending cylindrical body 30 having an annular interior side wall 72 defining a cylindrical inner chamber 68 for receiving core body 18 therein. Interior side wall 72 includes upper sealing surface 76, a recessed surface 78 positioned radially outward of sealing surface 76 to act as a seal-clearing surface, and a transitional surface 80 positioned to extend between sealing surface 76 and recessed surface 78.

Figure 7B:
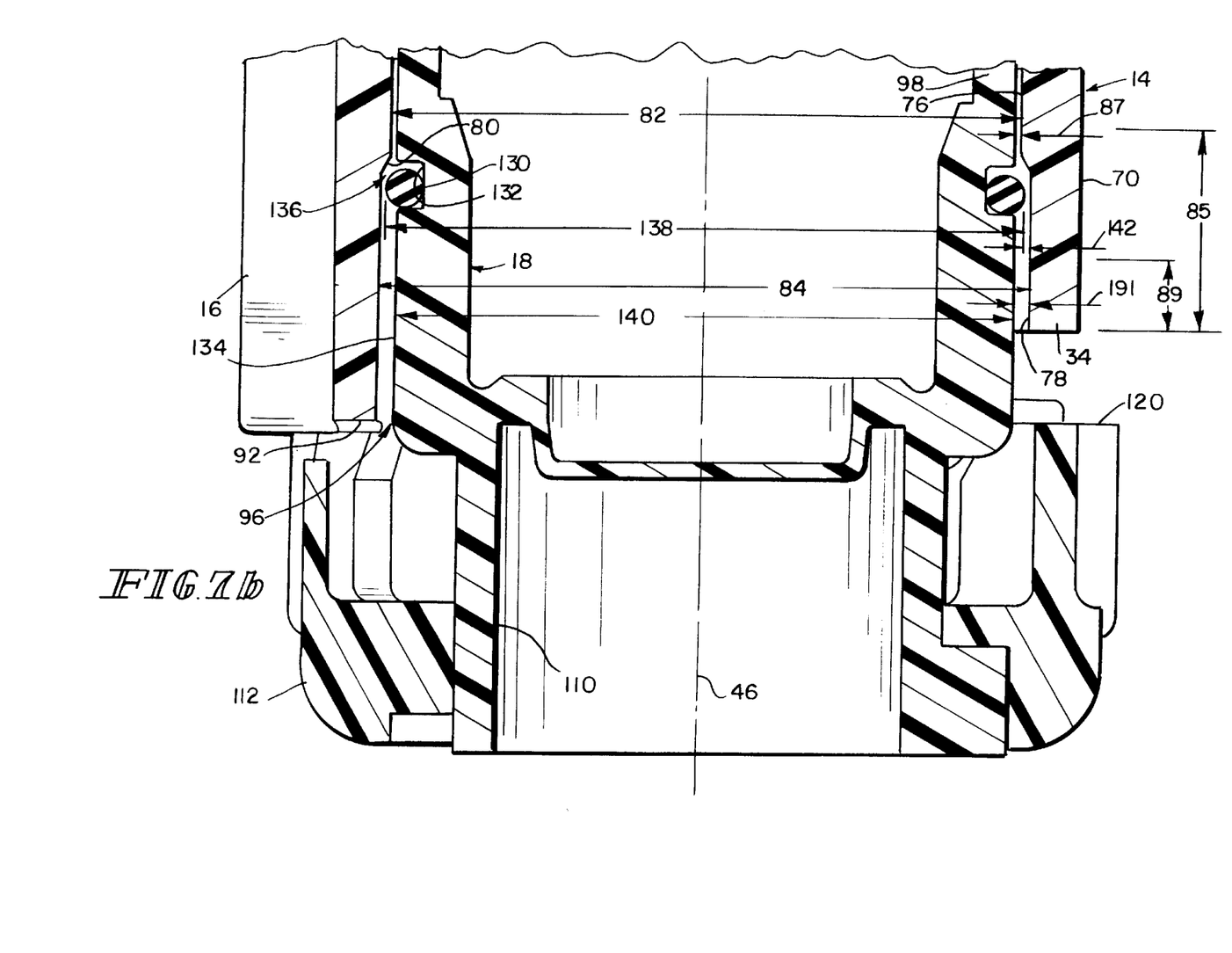
FIG. 7b is an enlarged view of the fuel cap of FIG. 7a, with portions removed for clarity, showing the sleeve, core body, O-ring, and the annular gap formed between the sleeve and the O-ring.

Sealing surface 76 has an inside diameter 82 and recessed surface 78 has an inside diameter 84 that is greater than inside diameter 82 of sealing surface 76. Thus, at a first axial distance 85 measured from axially lower end 34 of sleeve 14, sealing surface 76 of sleeve 14 is separated from core body 18 by a radial distance 87 and at a second distance 89 measured from axially lower end 34 of sleeve 14, recessed surface 78 of sleeve 14 is separated by a radial distance 91 that is greater than radial distance 87 as shown in FIG. 7b.

Transitional surface 80 extends radially outward from axis 46 and axially outward along axis 46 from recessed surface 78 to sealing surface 76 to provide a flat conical transition surface. Interior side wall 72 further includes an axially upper rim 86 at axially upper end 32 of sleeve 14 defining an opening 90 into chamber 74. Interior side wall 72 also includes an axially lower rim 92 at axially lower end 34 of sleeve 14 defining an opening 96 into chamber 74. As shown in FIG. 5, recessed surface 78 extends from transitional surface 80 to opening 96 defined by lower rim 92.

Figure 11:
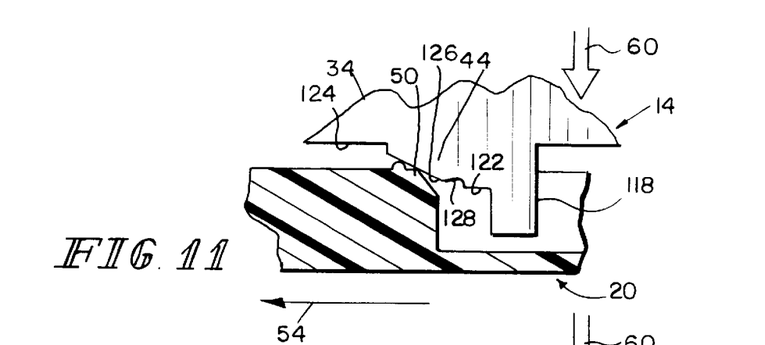
Figure 12:
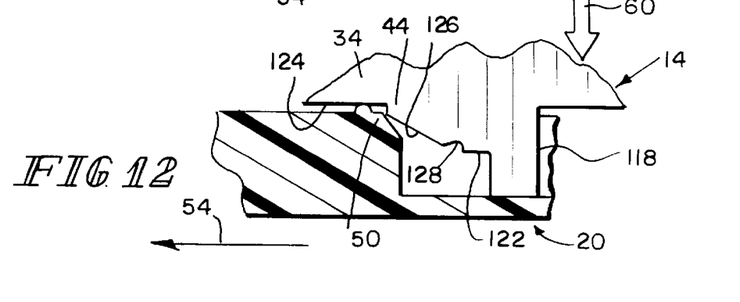
FIG. 12 is a view similar to FIG. 10 showing the cam resting on an upper platform of the cam follower while the sleeve is in the lower position shown in FIG. 9.

Cylindrical body 30 also includes an annular exterior side wall 70 and three anti-rotation ribs 16 are formed to lie in spaced-apart relation to one another about the circumference of exterior side wall 70. As shown in FIGS. 10–12, cam followers 44 on sleeve 14 are appended to lower end 34 of sleeve 14 and arranged to extend in axially lower direction 60 to engage three cylindrical cams 50 formed in lug member 20.

Handle cover 12 includes a top wall 62, an annular perimeter side wall 64, a plurality of axially projecting snap fingers 66, and a hollow lock-receiving neck 68 formed to receive a lock core (not shown). Handle cover 12 is used as a handle in the manner described below to rotate core 24 inside sleeve 14 because of a coupling between handle cover 12 and core body 18.

Core body 18 and lug member 20 are preferably formed as illustrated in FIG. 2. Core body 18 includes an axially extending tubular body member 98 and a flange 100 coupled to an upper end of tubular body member 98. Tubular body member 98 is sized to fit through opening 88 formed in axially upper end 32 of sleeve 14 and extend into inner chamber 74 formed in sleeve 14.

Core retainer 19 is ring-shaped and formed to include snap finger-receiving apertures 102. Flange 100 of core body 18 is sandwiched between handle cover 12 and core retainer 19 so that snap finger 66 are received in snap finger-receiving apertures 102 and core body 18 is "captured" between core retainer 19 and handle cover 12 as shown, for example, in FIG. 5.

Lug member 20 is cup-shaped and is sized to fit over a lower end 110 of core body 18 to be "captured" thereon. Retaining lugs 22 are appended to an exterior wall 112 of lug member 20 and arranged to lie in spaced-apart relation around the circumference of exterior wall 112. Lug member 20 also includes an interior wall 114 formed to include a stop face 116 configured to engage corresponding stop faces 118 formed in sleeve 14 to limit rotation of core 24 relative to sleeve 14 and correspondingly relative to filler neck 26. Each retaining lug includes an anchor face 120 for engaging an internal rim 56 in filler neck 26 to block withdrawal of core 24 from filler neck 26.

Fuel cap 10 also includes a spring-mounting ring 121. Spring-mounting ring 121 is positioned to lie under core body 18 and spring 48 is positioned to lie under spring-mounting ring 121 so that spring-mounting ring 121 is sandwiched between flange 100 of core body 18 and spring 48. Sleeve 14 is positioned under spring 48 and lug member 20 is positioned under sleeve 14 and "locked" onto lower end 110 of core body 18 so that spring 48 is compressed and sleeve 14 is biased downwardly against lug member 20.

Three cylindrical cams 50 are appended to lug member 20 and presented upwardly to be engaged by three downwardly extending cam followers 44 appended to sleeve 14 as shown best in FIG. 2. A flat development of each cam follower 44 is shown in FIGS. 10–12. The cam angles are selected to assist rotation of core 24 in cap-installation direction 54. Each cam follower 44 includes a top platform 122 for engaging cam 50 and supporting spring-loaded sleeve 14 in axially upper position shown in FIG. 10 corresponding to the loosened position of cap 10 as shown in FIG. 5. Each cam follower 44 also includes a bottom platform 124 for engaging cam 50 and supporting spring-loaded sleeve 14 in an axially lower position corresponding to the tightened position of cap 10 as shown in FIG. 9.

A downwardly sloping cylindrical or helical ramp 126 connects top and bottom platform 122, 124 of each cam follower 44 to engage cam 50 and guide spring-loaded sleeve 14 through the intermediate position between the axially upper position and the axially lower position in response to rotation of core 24 within filler neck 26 and relative to non-rotatable sleeve 14. Also, an axially extending detent 128 is provided between each top platform 122 and ramp 126 to inhibit movement of spring-loaded cam followers 44 off top platforms 122 and onto ramps 126 until enough torque is applied by a user to handle cover 12 to twist or rotate core 24 in filler neck 26. In practice, detents 128 prevent rotation of core 24 relative to sleeve 14 when quick-on cap 10 is not installed on a filler neck.

Cam 50 and cam follower 44 arrangement release spring 48 in response to rotational movement of core 24 in cap-installation direction 54 to load spring 48 in response to rotational movement of core 24 in opposite direction 55. Cams 50 on lug member 20 and cam followers 44 on sleeve 14 thus cooperate to control movement of annular sealing ring 40 on sleeve 14 into and out of sealing engagement with sealing rim 42 on filler neck 26.

As shown best in FIGS. 5, 7a, and 9, O-ring 130 (having an outside diameter 138), an O-ring receiving groove 132 formed in an exterior side wall 134 of core body 18 (having an outside diameter 140), and spring 48 cooperate to establish a fuel vapor seal between sleeve 14 and core 24. O-ring 130 fits around core body 18 and lies in O-ring-receiving groove 132 between interior side wall 72 of sleeve 14 and exterior side wall 134 of core body 18.

Outside diameter 138 of O-ring 130 is greater than outside diameter 140 of exterior side wall 134 so that O-ring 130 extends beyond exterior side wall 134 by a distance 142 as shown in FIG. 7b. Outside diameter 138 of O-ring 130 is less than inside diameter 84 of recessed surface 78 and greater than inside diameter 82 of sealing surface 76 so that recessed surface 78 does not engage O-ring 130 when sleeve 14 is in the axially upper and intermediate positions and O-ring 130 is adjacent to recessed surface 78, as shown in FIGS. 5, 7a, and 7b. Sealing surface 76 engages O-ring 130 when sleeve 14 is in the axially lower position, as shown in FIG. 9, so that O-ring 130 is adjacent to sealing surface 76.

When cap 10 is in the loosened position so that cams 50 of lug member 20 rest on top platform 122 of sleeve 14, sleeve 14 is in the axially upper position so that O-ring 130 is spaced apart from sleeve 14 so that gap 136 exists between recessed surface 78 of interior side wall 72 of sleeve 14 and O-ring 130. Cams 50 on lug member 20 are forced over detents 128 of sleeve 14 during rotation of core 24 and O-ring 130 so that cams 50 engage ramp 126. Spring 48 then biases sleeve 14 axially inward relative to lug member 20 in direction 60 so that O-ring 130 and recessed surface 78 continue to define gap 136 therebetween. Because annular gap 136 continues to exist between O-ring 130 and sleeve 14 during rotation of core 24 and O-ring 130, O-ring 130 is not scuffed or otherwise damaged by sleeve 14.

As cams 50 continue to travel down ramps 126 to the tightened position, O-ring 130 engages transitional surface 80 of interior side wall 72 of sleeve 14. Sleeve 14 continues to move axially inward relative to lug member 20 until cams 50 reach bottom platform 124 of lug member 20 and O-ring 130 contacts sealing surface 76 of interior side wall 72 of sleeve 14 so that O-ring 130 is radially compressed between sleeve 14 and core body 18 to provide a sealed barrier therebetween.

Although the invention has been described in detail with reference to certain preferred embodiments, variations and modifications exist within the scope and spirit of the invention as described and defined in the following claims.

What is claimed is:

1. A cap engagable with a filler neck of a vehicle fuel tank, the cap comprising
    a core including an axially lower end, an axially upper end, and an exterior side wall extending between the axially lower and upper ends,
    a handle coupled adjacent the axially upper end of the core and adapted to rotate the core about an axis of rotation between a loosened position permitting removal of the core from the filler neck and a tightened position securing the core within the filler neck,
    a seal positioned to lie around the core,
    a sleeve movable axially by the handle and having an interior side wall defining a chamber formed in the sleeve, the core being positioned to lie within the chamber, the seal being positioned to lie between the sleeve and the core,
    wherein a gap is formed between the seal and the interior side wall of the sleeve during rotation of the core relative to the filler neck from the loosened position to the tightened position, and the gap is eliminated when the cap is in the tightened position.

2. The cap of claim 1, the interior side wall of the sleeve having a sealing surface that engages the seal while the core is in the tightened position and a seal-clearing surface that cooperates with the seal to define the gap while the core is between the loosened and tightened positions.

3. The cap of claim 2, wherein the interior side wall further includes a transition surface extending axially and radially between the sealing surface and the seal-clearing surface.

4. The cap of claim 2, wherein the interior side wall further includes a conical transitional surface positioned to extend between the sealing surface and the seal-clearing surface.

5. A cap engagable with a filler neck of a vehicle fuel tank, the cap comprising
    a core including an axially lower end, an axially upper end, an exterior side wall extending between the axially lower and upper ends, and a lug coupled to the axially lower end,
    a handle coupled adjacent the axially upper end of the core and adapted to rotate the core relative to a filler neck about an axis of rotation between a loosened position permitting removal of the core from the filler neck and a tightened position securing the core within the filler neck,
    a seal coupled to the exterior side wall of the core, and
    a sleeve movable axially by the handle and having an interior side wall defining a chamber, the sleeve positioned around the core, the interior side wall including a sealing surface and a recessed surface, the recessed surface positioned between the sealing surface and the lug, wherein the sealing surface has a diameter smaller than the recessed surface.

6. The cap of claim 5, wherein the sleeve includes an axially lower end including a first rim defining an opening into the chamber, an axially upper end spaced apart from the axially lower end and including a second rim defining an opening into the chamber, and the recessed surface extends to the opening in the lower end of the sleeve.

7. The cap of claim 5, further comprising an annular seal, and wherein the sleeve includes an axially lower end, an axially upper end spaced apart from the axially lower end, and a flange coupled to the axially upper end, and the annular seal is coupled to the flange.

8. The cap of claim 5, wherein the interior side wall further includes a transition surface between the sealing surface and the recessed surface.

9. The cap of claim 5, wherein the seal includes an outside diameter that is greater that the first diameter of the sleeve and less than the second diameter of the sleeve.

10. A cap engagable with a filler neck of a vehicle fuel tank, the cap comprising
    a core including an axially lower end, an axially upper end, and an exterior side wall extending between the axially lower and upper ends,
    a handle coupled adjacent the axially upper end of the core and adapted to rotate about an axis of rotation between a loosened position permitting removal of the core from a filler neck and a tightened position securing the core within the filler neck,
    a seal positioned around the core,
    a sleeve movable by the handle and having an axially upper end, an axially lower end, and an interior side wall extending between the axially upper and lower ends, the interior side wall positioned around the core; wherein, a first radial distance is formed between the interior side wall of the sleeve and the exterior side wall of the core when the cap is moved to the tightened position, and wherein a second radial distance is formed between the interior side wall of the sleeve and the exterior side wall of the core when the cap is moved to the loosened position, the second radial distance greater than the first radial distance.

11. The cap of claim 10, wherein the first radial distance is formed adjacent the upper end of the sleeve, and the second radial distance is formed adjacent the lower end of the sleeve.

12. The cap of claim 10, wherein the seal extends beyond the exterior side wall of the core by a distance that is greater than the first radial distance and less than the second radial distance.

13. The cap of claim 10, wherein the sleeve is configured to move between an axially upper position relative the core and an axially lower position relative the core, and wherein the seal engages the sleeve in the axially lower position, and is spaced apart from the sleeve in the axially upper position.

14. A cap engagable with a filler neck of a vehicle fuel tank, the cap comprising     a core including an axially lower end, an axially upper end, an exterior side wall extending between the axially lower and upper ends, and a lug coupled to the axially lower end, the exterior side wall having a seal-receiving groove formed therein,     a handle coupled adjacent the axially upper end of the core and adapted to rotate the core relative to a filler neck between a loosened position permitting removal of the core from the filler neck and a tightened position securing the core within the filler neck,     a seal within the seal-receiving groove, and     a sleeve movable by the handle having a sealing wall, a recessed wall positioned radially outward of the sealing wall and between the sealing wall and the lug of the core, a transitional wall between the sealing wall and the recessed wall;

the sealing wall, the transitional wall, and the recessed wall defining a chamber, the core positioned within the chamber, the sealing wall having a diameter smaller than the recessed wall.

15. A cap engagable with a filler neck of a vehicle fuel tank, the cap comprising     a core including a lower end and upper end, an exterior side wall between the lower and upper ends, and a lug coupled to the lower end,     a handle coupled adjacent the upper end of the core and adapted to rotate the core relative to a filler neck about an axis of rotation between a loosened position permitting removal of the core from the filler neck and a tightened position securing the core within the filler neck,     a seal coupled to the exterior side wall of the core, and     a sleeve movable by the handle having an interior side wall defining a chamber, the sleeve is positioned around the core, the interior side wall including a sealing surface and a recessed surface between the sealing surface and the lug, the sealing surface having a diameter smaller than the recessed surface, wherein the sleeve includes a lower end, an upper end spaced apart from the lower end, and a flange coupled to the upper end, and the annular seal is coupled to the flange.

16. A cap engagable with a filler neck of a vehicle fuel tank, the cap comprising     a core including a lower end, an upper end, and an exterior side wall extending between the lower and upper ends,     a handle coupled adjacent the upper end of the core and adapted to rotate about an axis of rotation between a loosened position permitting removal of the core from a filler neck and a tightened position securing the core within the filler neck,     a seal positioned to lie around the core,     a sleeve having an upper end, an axially lower end, and an interior side wall between the upper and lower ends, thereby defining a chamber, the sleeve being positioned to lie around the core;

wherein, the interior side wall of the sleeve and the exterior side wall of the core defines a first radial distance therebetween at a first axial distance measured from the lower end of the sleeve and a second radial distance therebetween at a second axial distance measured from the lower end of the sleeve, the second radial distance being greater than the first radial distance; and wherein,     as the sleeve moves axially between an a upper position relative the core and a lower position relative the core, the seal engages the sleeve when the sleeve is in the axially lower position and is spaced apart from the sleeve when the sleeve is in the axially upper position.

\* \* \* \* \*